(12) United States Patent
Ondruska et al.

(10) Patent No.: US 10,696,300 B2
(45) Date of Patent: Jun. 30, 2020

(54) VEHICLE TRACKING

(71) Applicant: BLUE VISION LABS UK LIMITED, London (GB)

(72) Inventors: Peter Ondruska, London (GB); Lukas Platinsky, London (GB); Suraj Mannakunnel Surendran, London (GB)

(73) Assignee: BLUE VISION LABS UK LIMITED, London (GB)

(*) Notice: Subject to any disclaimer, the term of this patent is extended or adjusted under 35 U.S.C. 154(b) by 0 days.

(21) Appl. No.: 16/459,575

(22) Filed: Jul. 1, 2019

(65) Prior Publication Data
US 2019/0322275 A1 Oct. 24, 2019

Related U.S. Application Data

(63) Continuation of application No. PCT/GB2019/050514, filed on Feb. 25, 2019.

(30) Foreign Application Priority Data

Mar. 15, 2018 (GB) .................................. 1804195.4
Jun. 29, 2018 (GB) .................................. 1810796.1

(51) Int. Cl.
*G06K 9/00* (2006.01)
*B60W 30/095* (2012.01)
(Continued)

(52) U.S. Cl.
CPC ..... *B60W 30/0956* (2013.01); *G01C 21/3635* (2013.01); *G01C 21/3647* (2013.01);
(Continued)

(58) Field of Classification Search
CPC ......... B60W 30/0956; B60W 2520/06; B60W 2520/10; G05D 1/0214; G05D 1/0231; G05D 1/027
(Continued)

(56) References Cited

U.S. PATENT DOCUMENTS 7,610,182 B2 * 10/2009 Smith ................. G06F 17/5009
                                                              703/2
9,120,484 B1    9/2015 Ferguson et al.
(Continued)

FOREIGN PATENT DOCUMENTS

GB       2545550       6/2017
WO     2017035663      3/2017

OTHER PUBLICATIONS

Chen et al., "Modeling and Predicting Future Trajectories of Moving Objects in a Constrained Network", Mobile Data Management, MDM 2006, 7th International Conference on Nara, Japan, May 10-12, 2006, p. 156.
(Continued)

*Primary Examiner* — Gertrude Arthur Jeanglaude
(74) *Attorney, Agent, or Firm* — Sheppard Mullin Richter & Hampton LLP

(57) ABSTRACT

The present invention relates to a method and system for accurately predicting future trajectories of observed objects in dense and ever-changing city environments. More particularly, the present invention relates to the use of prior trajectories extracted from mapping data to estimate the future movement of an observed object. As an example, an observed object may be a moving vehicle. Aspects and/or embodiments seek to provide a method and system for predicting future movements of a newly observed object, such as a vehicle, using motion prior data extracted from map data.

20 Claims, 13 Drawing Sheets

(51) Int. Cl.
  *G01C 21/36* (2006.01)
  *G05D 1/02* (2020.01)
  *G06F 17/18* (2006.01)
  *G06T 7/20* (2017.01)

(52) U.S. Cl.
  CPC ........... *G05D 1/0212* (2013.01); *G06F 17/18* (2013.01); *G06K 9/00671* (2013.01); *G06K 9/00791* (2013.01); *G06T 7/20* (2013.01); *B60W 2520/06* (2013.01); *B60W 2520/10* (2013.01); *G05D 1/027* (2013.01); *G05D 1/0214* (2013.01); *G05D 1/0231* (2013.01); *G05D 2201/0213* (2013.01)

(58) Field of Classification Search
  USPC .......................................................... 701/27
  See application file for complete search history.

(56) References Cited

U.S. PATENT DOCUMENTS

| | | |
|---|---|---|
| 9,483,948 B1 | 11/2016 | Gordon et al. |
| 9,495,874 B1 | 11/2016 | Zhu et al. |
| 2014/0327792 A1 | 11/2014 | Mulloni et al. |
| 2016/0334797 A1 | 11/2016 | Ross et al. |
| 2017/0177937 A1 | 6/2017 | Harmsen et al. |
| 2017/0301107 A1 | 10/2017 | Sasaki |

OTHER PUBLICATIONS

Leibe, et al. "Dynamic 3D Scene Analysis from a Moving Vehicle", IEEE Conference on Computer Vision and Pattern Recognition, Jun. 2007.

Nadembega et at., "A Destination Prediction Model based on historical data, contextual knowledge and spatial conceptual maps", Communications (ICC), IEEE International Conference, Jun. 10, 2012, pp. 1416-1420.

Nizetic et al., "Automation of the moving objects movement predicition process independent of the application area", Computer Science and Information Systems, vol. 7, No. 4, Jan. 2010, pp. 931-45.

Vu et al., "A method for predicting future location of a mobile user for location-based services system", Computers & Industrial Engineering, vol. 57, Iss. 1, Aug. 1, 2009, pp. 91-105.

* cited by examiner

Input

$s_0$: initial state (position, rotation, velocity)
    t: time horizon
    G: motion prior

Output

$\hat{s}_{1:N}$: samples of the predicted future car state

Compute prior state relevance
1:  $Z \leftarrow \sum_{i,j} K(s_i^j, s_0)$
2:  $\mu_i^j \leftarrow \frac{1}{Z} K(s_i^j, s_0)$
    Sample future state
3: for k = 1,2,3,...,N do
    Sample prior state according to relevance
4:     $s_j^i \leftarrow$ MultinomialSample$(G, \mu)$
    Sample future state
5:     $\hat{s}_k \leftarrow s_{j+t}^i + \epsilon$
6: end for
7: return $\hat{s}_{1:N}$

Figure 6

VEHICLE TRACKING

CROSS-REFERENCE TO RELATED APPLICATIONS

The present application is a continuation of International Application No. PCT/GB2019/050514 filed Feb. 25, 2019, which claims priority to Great Britain Patent Application No. 1804195.4 filed Mar. 15, 2018 and Great Britain Patent Application No. 1810796.1 filed Jun. 29, 2018, which are hereby incorporated by reference herein.

FIELD

The present invention relates to a method and system for accurately predicting future trajectories of observed objects in dense and ever-changing city environments. More particularly, the present invention relates to the use of prior trajectories extracted from mapping data to estimate the future movement of an observed object. As an example, an observed object may be a moving vehicle.

BACKGROUND

A fundamental task of robotics perception and planning in dynamic environments is the ability to predict future evolution of the situation around the robot. For example, autonomous vehicles need to know about the positions of other cars and their future motion to plan and avoid collisions.

In robotics, critical tasks such as path planning and obstacle avoidance require the ability to predict or estimate the evolution of the environment around the robot. Complex environments such as urban city traffic present significant challenges when it comes to such planning and perception. Methods for doing so play a significant role in reducing the risk of collisions, such as road accidents.

Currently, future movement predictions in semi-structured environments are usually based on assumed motion dynamics of the vehicles around the robot or vehicle, for example by using a Kalman Filter. However, a common disadvantage is that they often generalise the vast complexity of real world scenarios, such as busy intersections or turns, resulting in unreliable predictions. Similarly, the motion of vehicles in complex scenarios cannot usually be predicted reliably using simple motion models like linear extrapolation, especially if the prediction horizon is greater than a few seconds.

Another existing approach is to annotate the road infrastructure in the form of a semantic map by capturing and making a note of traffic rules which should indicate paths that vehicles are likely to follow. This has a benefit in that the map data can be used to extrapolate the expected motion of a car provided that a driver follows the traffic rules. However, the amount of work needed to produce such reliable maps and then to keep them updated is time consuming and heavily laborious.

It is an aim of the present invention to address one or more of the disadvantages associated with the prior art.

SUMMARY OF INVENTION

Aspects and/or embodiments seek to provide a method and system for predicting future movements of a newly observed object, such as a vehicle, using motion prior data extracted from map data.

According to a first aspect, there is provided a method for estimating movements of an object, the method comprising; receiving initial state data of the object at a first time; receiving sequential trajectory data for one or more prior moving objects that intersected the vicinity of the position of said object; estimating future positions of the detected object, at a second time, in dependence upon the sequential trajectory data for thee one or more prior moving objects; and constraining the future positions of the object in dependence upon a comparison between the object and the one or more prior moving objects for which the sequential trajectory data intersects the vicinity of the position of said object, wherein the constrained future positions of the detected object are indicative of the estimated movement of the object at the second time.

By relating the current position of an observed object, such as a vehicle, to a dataset of previously exhibited motions by other objects or vehicles in the same area an accurate prediction of the object's future position can be determined. In this way, the future position of a newly detected object, such as a vehicle, can be estimated without the need for any knowledge of the road infrastructure or traditional motions models.

Optionally, the initial state data of an object comprises a position, rotation and velocity in a 3D space.

Optionally, a step of detecting and determining the initial state data wherein determining the initial state data of the object comprises calculating pose data for the object. Pose data may relate to position and orientation of the detected object.

Optionally, the sequential trajectory data further comprises a sequence of observed states for one or more prior moving objects. In this way, each trajectory path data for a previous vehicle traversing an area includes a plurality of state information through the path. Optionally, the observed states for the one or more prior moving objects comprises a position, a rotation and a velocity of the object at regular time intervals.

Optionally, the sequential trajectory data is extracted from data used to construct 3D maps of an environment.

Optionally, receiving the sequential trajectory data comprises using at least one visual data sensor in the one or more prior moving objects. Optionally, the at least one visual data sensor comprises any or a combination of: an image camera; a video camera; a monocular camera; a depth camera; a stereo image camera; a high dynamic range camera, a light detection and ranging sensor; a radio detection and ranging sensor; an inertial measurement unit.

In this way cheap visual sensors such as mobile phone cameras can be exploited to collect city-scale motion patterns and environmental information which can be effectively used for trajectory predictions without any explicit modelling. In the past, some approaches relied on calibrating a stereo rig mounted on a car which can be less efficient.

Optionally, receiving the sequential trajectory data comprises performing structure from motion. Information gathered from structure from motion can be used as a powerful high-fidelity prior to predict future trajectories of newly observed vehicles in the area without the need for any knowledge of road infrastructure or vehicle motion models.

Optionally, estimating future positions of the object further comprises hypothesising that the object is following a trajectory path of each of the one or more prior moving objects from the same location as the object.

Optionally, estimating future positions of the object further comprises using location data from the one or more prior moving objects.

By relating the current position of the observed car to a large dataset of the previously exhibited motion in the area we can directly perform prediction for its future position. In addition, the use of large-scale ground and motion priors result in more accurate future predictions.

Optionally, estimating future positions of the object further comprises estimating a future pose of the object.

Optionally, the future pose estimate comprises a random noise model inclusion so as to account for deviations in the trajectory. In this way, the random noise model can compensate for numerous anomalous road or environmental occurrences.

Optionally, the future pose estimate is the observed pose of a prior moving object, having previously intersected the vicinity of the position of said object, after a time interval.

Optionally, constraining the future positions of the detected object further comprises determining state comparisons between the one or more prior moving objects and the object. In this way similarities or difference can be drawn between prior information and the detected object.

Optionally, the differences or similarities comprises any one of, or any combination of a difference or similarity in a Euclidean distance in the 3D space; relative difference of heading angle; and difference in linear speed.

Optionally, constraining the future positions of the object are weighted in order to output either a wider or narrower set of samples. In doing this, the method can lay more importance on a particular component such as distance, speed or rotation.

Optionally, constraining the future positions of the object comprises narrowing the estimated future positions in dependence upon state.

Optionally, the object and/or the one or more prior moving objects comprise an odometry system.

Optionally, the object comprises any of or a combination of a vehicle, a bicycle, motor-cycle.

Optionally, estimating the movements of the object are performed in substantially real-time. The use of prior data and neural networks can be used to provide instantaneous estimations for newly detected objects.

According to another aspect, there is provided a system for estimating movements of an object, the system operable to perform the method of any aforementioned features.

According to another aspect, there is provided a system for estimating movements of an object, the system operable to perform the method of any aforementioned features, the system comprises: a prediction system for receiving initial state data of the object at a first time and estimating future movements of the object; and an environmental database for storing sequential trajectory data for one or more prior moving objects that intersected the vicinity of the position of said object.

Optionally, the prediction system and environmental database are modular components to the system. In this way, the system decouples the prediction system and environment knowledge database thereby enables the environment priors to be updates easily.

According to another aspect, there is provided a computer program product for providing the method or system of any preceding claim.

BRIEF DESCRIPTION OF DRAWINGS

FIG. 6 depicts the logic flow of an embodiment;

DETAILED DESCRIPTION

Figure 1:
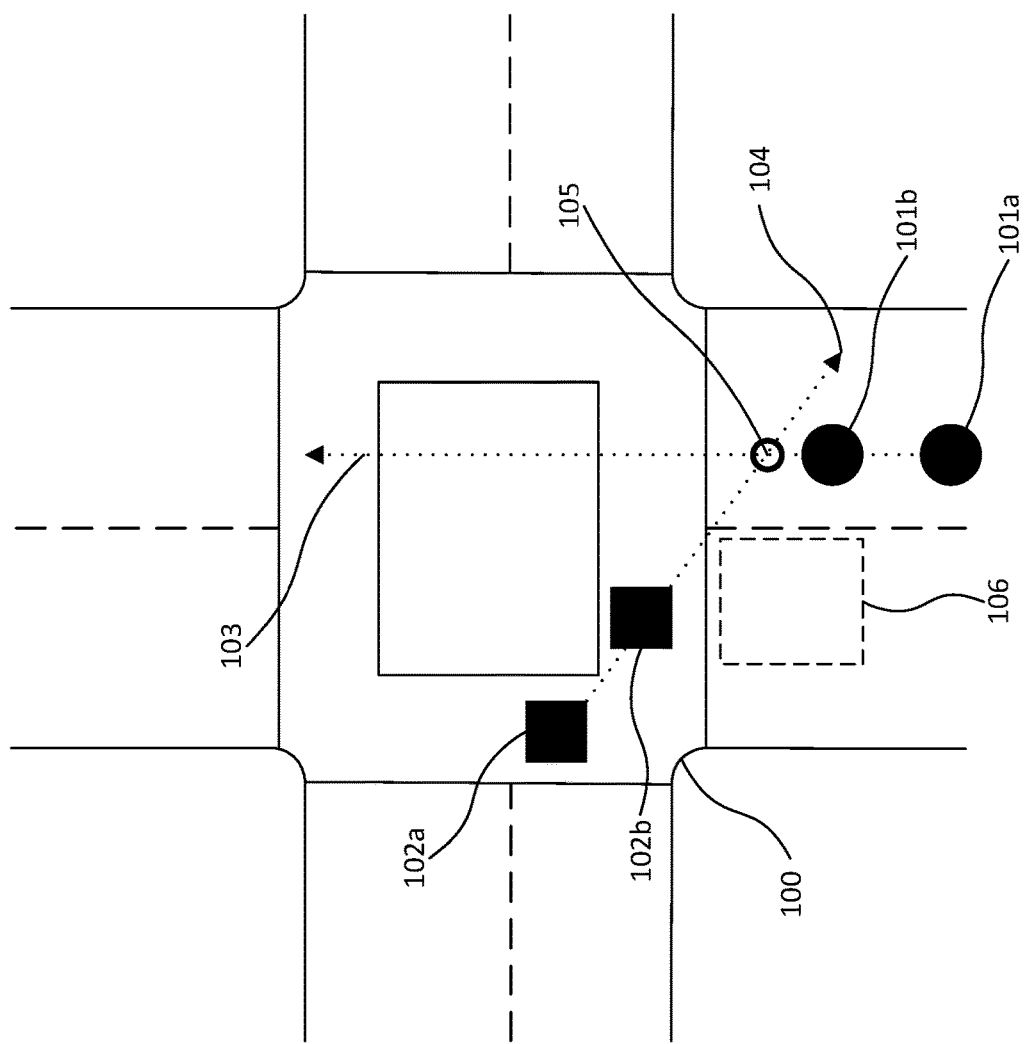
FIG. 1 illustrates an example of a known linear extrapolation model to predict the future position of a detected vehicle at an intersection.

FIG. 1 depicts one of the problems seen by current methods of predicting future motion. More specifically, the illustration relates to motion models that rely on linear extrapolation of motion data.

The figure shows a bird's eye view of a four-way road intersection 100. A first vehicle 101 is depicted approaching the intersection. The position of the first vehicle at a first time, t, is shown as 101a and the position of the first vehicle at a second time, t+1, is shown as 101b. The trajectory of the first vehicle is indicated as a straight path 103.

A second vehicle 102 is also depicted in the figure. The second vehicle is seen mid-way through the intersection at the first time, t, shown as 102a and the second time, t+1, shown as 102b. Although in real-world scenarios, the position on the second vehicle is likely to be in the area indicated by 106, using the linear motion model, the system assumes the second vehicle is traversing along a second straight path 104. According to this interpretation, the linear model expects the two vehicles to collide at point 105 which is the point the first 103 and second 104 straight paths intersect.

However, anyone with an appreciation of traffic rules and/or a highway code will at a first glance disagree with the expected collision predicted by the linear motion model. Since linear motion models do not incorporate curved motions of real world scenarios the true nature of where the second vehicle is actually likely to be after passing through the intersection 106 is not accounted for. The use of these models therefore results in inaccurate and unreliable estimations of future positions of moving vehicles.

In a similar way, various methods have been proposed over years to understand and model vehicle motion dynamics, driver intent and vehicle interactions with the environment and neighboring agents. In most cases, motion prediction involves relying fully or partly on a vehicle dynamics model. For example, some methods compare and evaluate several motion models for tracking vehicles. These methods conclude that constant turn rate and acceleration model (CTRA) perform the best. Other methods include constant turn rate and velocity (CTRV), constant steering angle and velocity (CSAV), constant curvature and acceleration (CCA) and purely linear motion models such as constant velocity (CV) or constant acceleration (CA), as previously described.

These models are usually combined with Kalman filtering or Bayesian filtering for path prediction. However, these approaches are only able to perform predictions for a very short window into the future. In order to address this, some models combine a constant yaw rate and acceleration model with a manoeuvre classifier to predict vehicle trajectories. But these methods are restricted to limited scenarios and are constrained by the number of manoeuvres.

As opposed to explicitly crafting vehicle dynamics, Dynamic Bayesian networks, Gaussian mixture models, Hidden Markov models, Neural networks or a combination of these techniques are used to provide data-driven approaches to vehicle dynamics. Although these approaches achieve better performance than pure vehicle dynamics based approaches, they are either trained for specific limited scenarios (e.g., highways) or tend to learn a general model that does not utilise environment specific cues such as traffic pattern in the area, changes in the environment structure, etc.

An example embodiment will now be described with reference to FIGS. 2 to 6.

Figure 2:
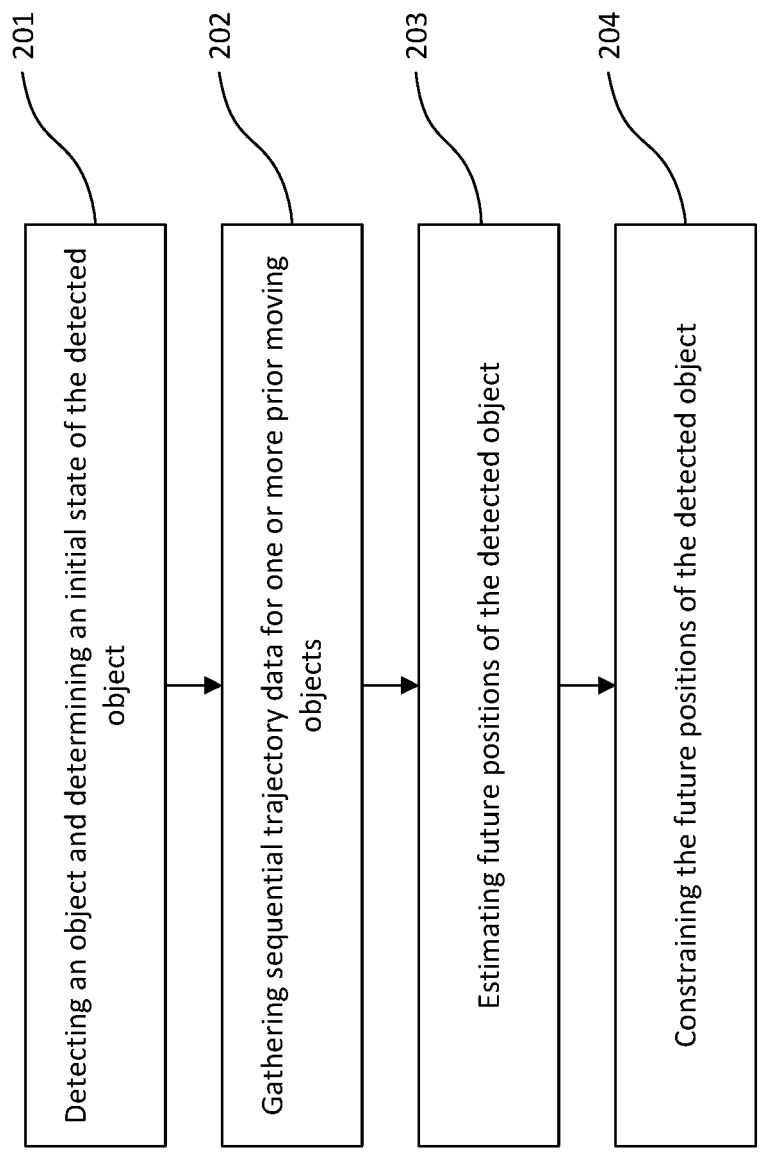
FIG. 2 illustrates a flowchart according to an embodiment.

As illustrated in FIG. 2, the first step of the method implemented by the invention is to detect a moving object, such as a vehicle, and capture data relating to the observed state of the moving vehicle 201. There is no restriction to the methods used to initially detect a moving vehicle. As an example, the use of neural networks may be incorporated to identify an object and place a bounding box around the pixels that represent the object.

The initial state ($s_0$) of the car includes position data ($x_0 \in R^3$), rotation data ($r_0 \in SO(3)$) and velocity data ($v_0 \in R$). Mathematically this can be represented as:

$$s_0 = (x_0, r_0, v_0)$$

As illustrated in step 202, the method then brings together trajectory data of vehicles that have previously traversed the area in which the new moving vehicle was detected. Although any traditional method may be implemented to obtain this data the preferred option is to extract data from map data that was constructed using structure-from-motion techniques. This advantageously enables a large amount of crowd-sourced high-quality motion data to drive the motion prediction of this invention. As an example, this type of data can be collected by equipping a large fleet of vehicles with cameras and performing structure-from-motion at a city scale to accurately reconstruct their trajectories. As will be further elaborated below, this data can be used a sample for the underlying motion distribution in the area and be used for future motion prediction of newly observed cars.

Structure from motion methods have the benefits of needing zero human annotation as it implicitly captures modelled and unmodelled aspects of the vehicle motion, scales to large city-scale scenarios and improves with time as the amount of data increases. This data is usually built up of sequential images over a period of time. Additionally, each image also includes pose information which can be used to vehicles position, rotation and velocity along its path.

Figure 3A:
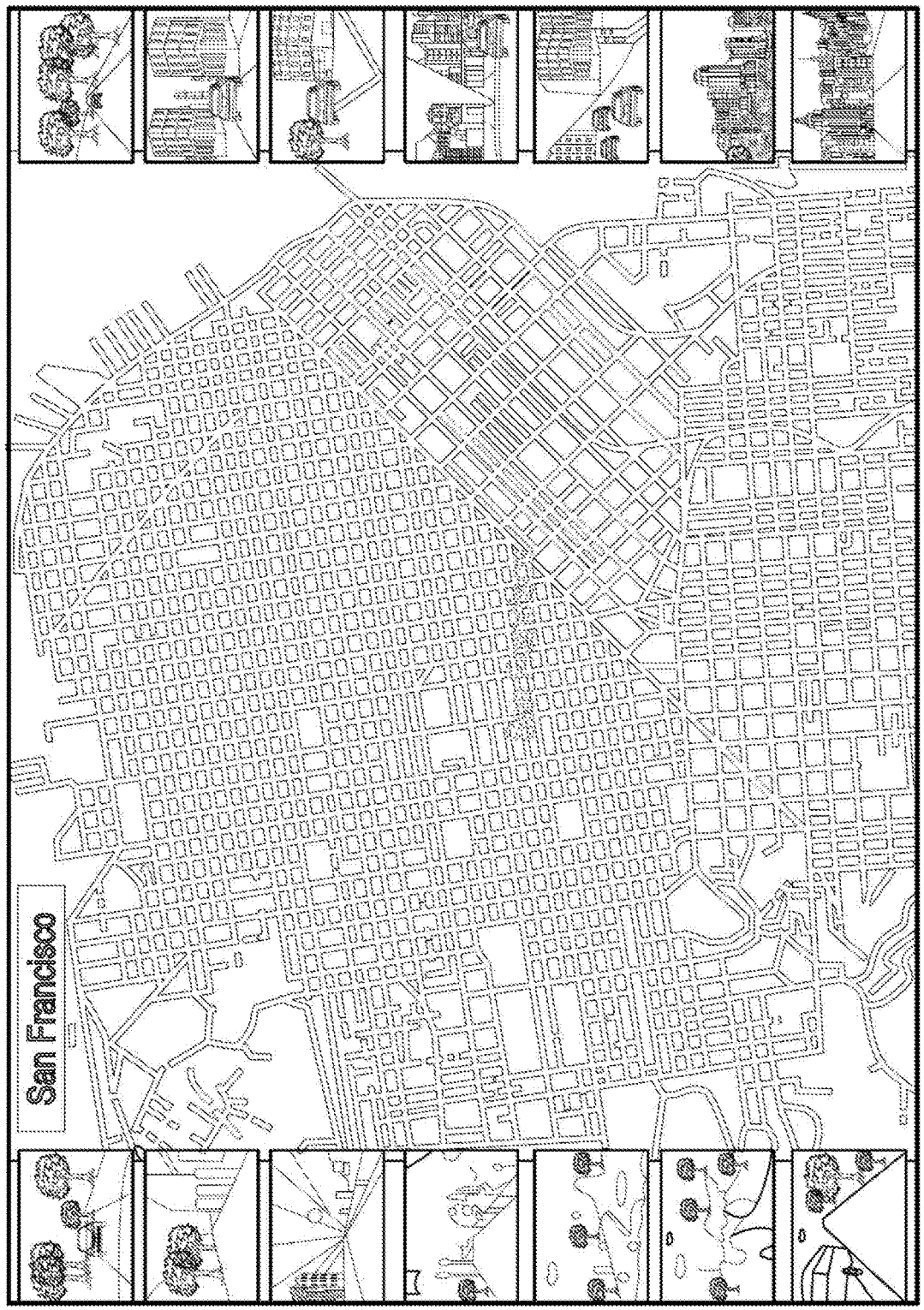
FIGS. 3a and 3b illustrate map datasets used by an embodiment.
Figure 3B:

Example city scale map datasets are depicted in FIGS. 3a and 3b. The datasets shown in these figures were compiled using over ten million images captured in San Francisco and New York using dash-cam mounted mobile phones. The images were used to perform large-scale structure-from-motion to reconstruct accurate vehicle trajectories in the cities over a period of several weeks. Although a monocular camera of a mobile phone was executed to derive the datasets shown in this figure, any type of visual sensor may be used to compile the initial sequential image data. As a result, prior trajectory data can be automatically extracted as a by-product of building a large-scale crowd-sourced 3D map of the environment.

Figure 4A:
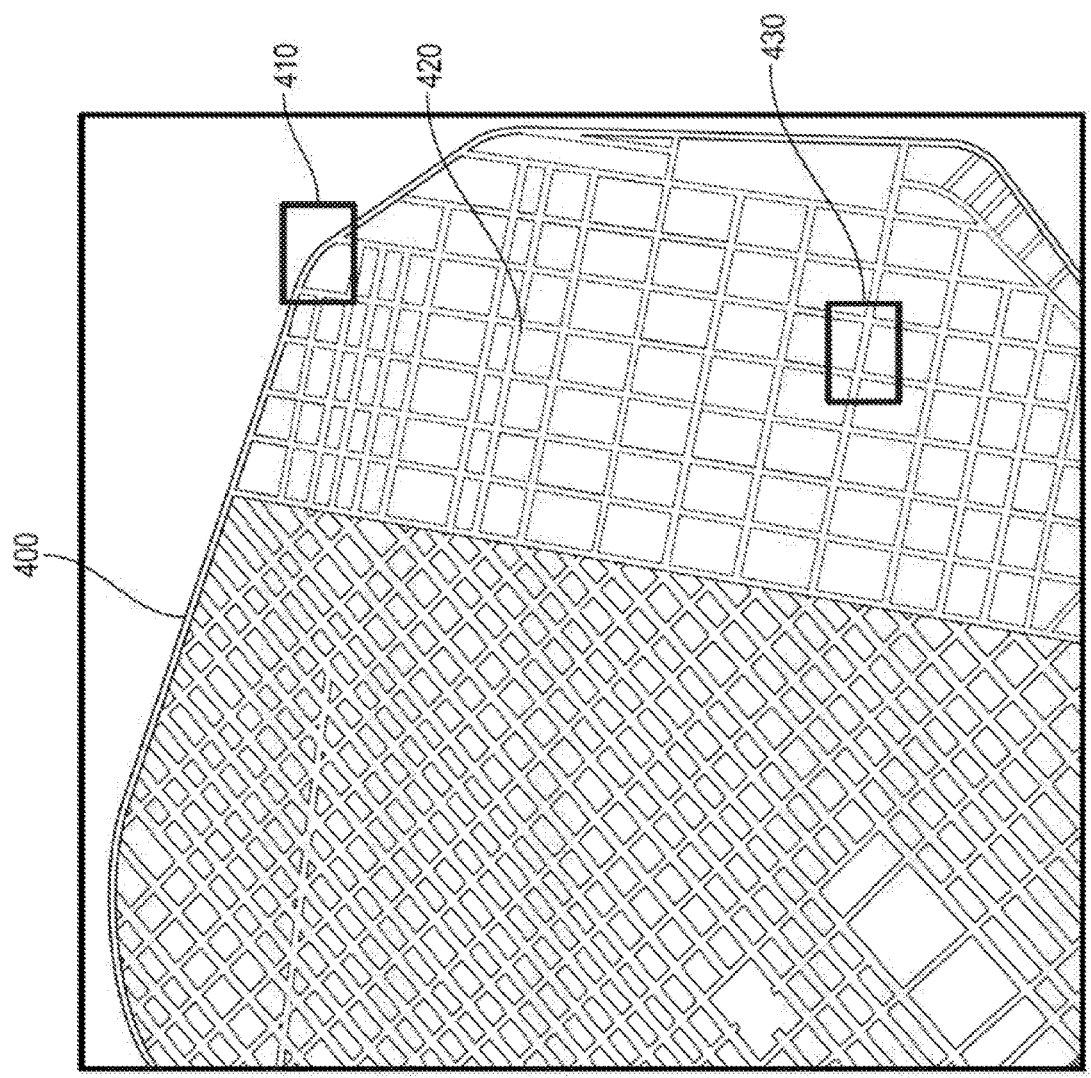
FIGS. 4a, 4b, 4c and 4d illustrate prior trajectory information used by an embodiment.
Figure 4B:
Figure 4C:
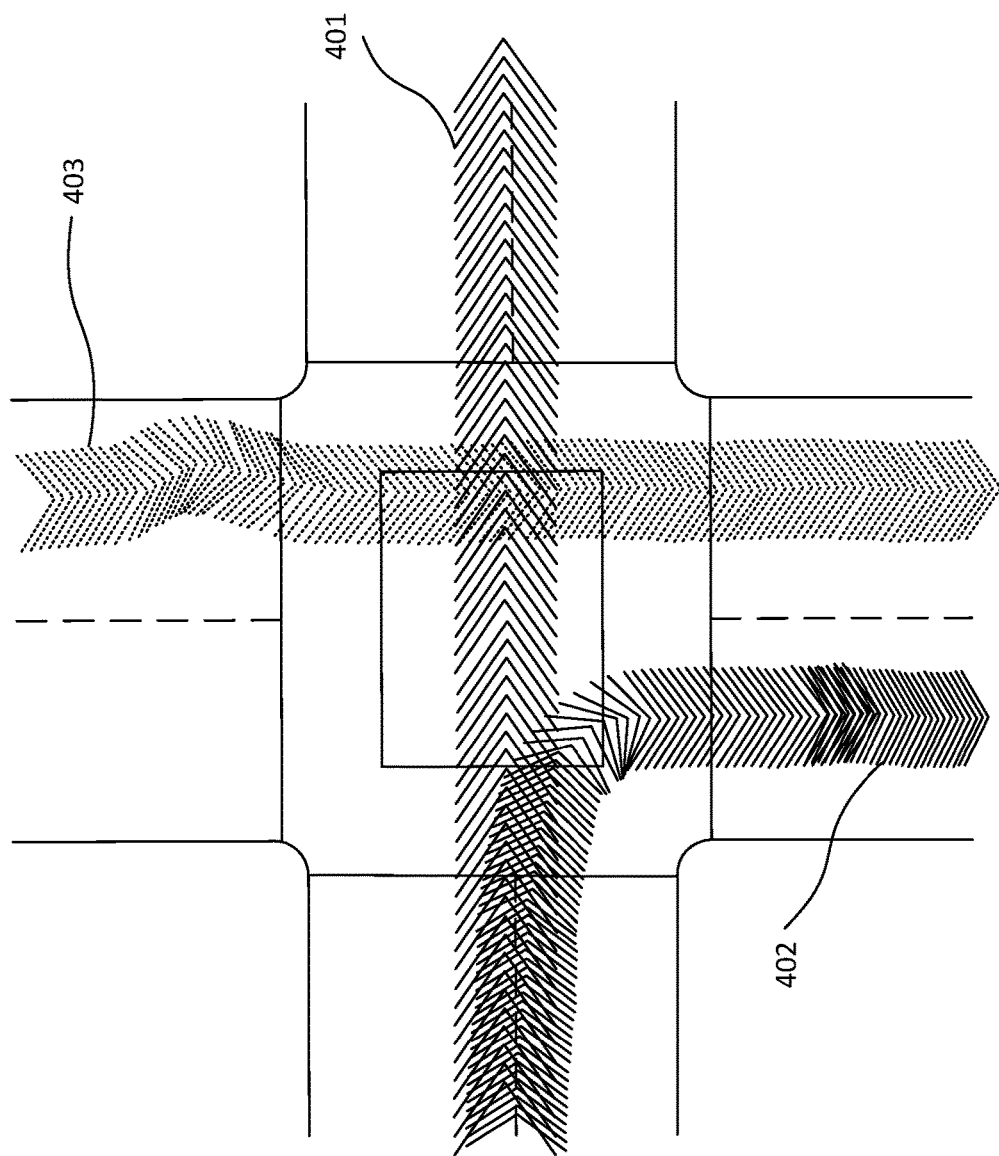
Figure 4D:
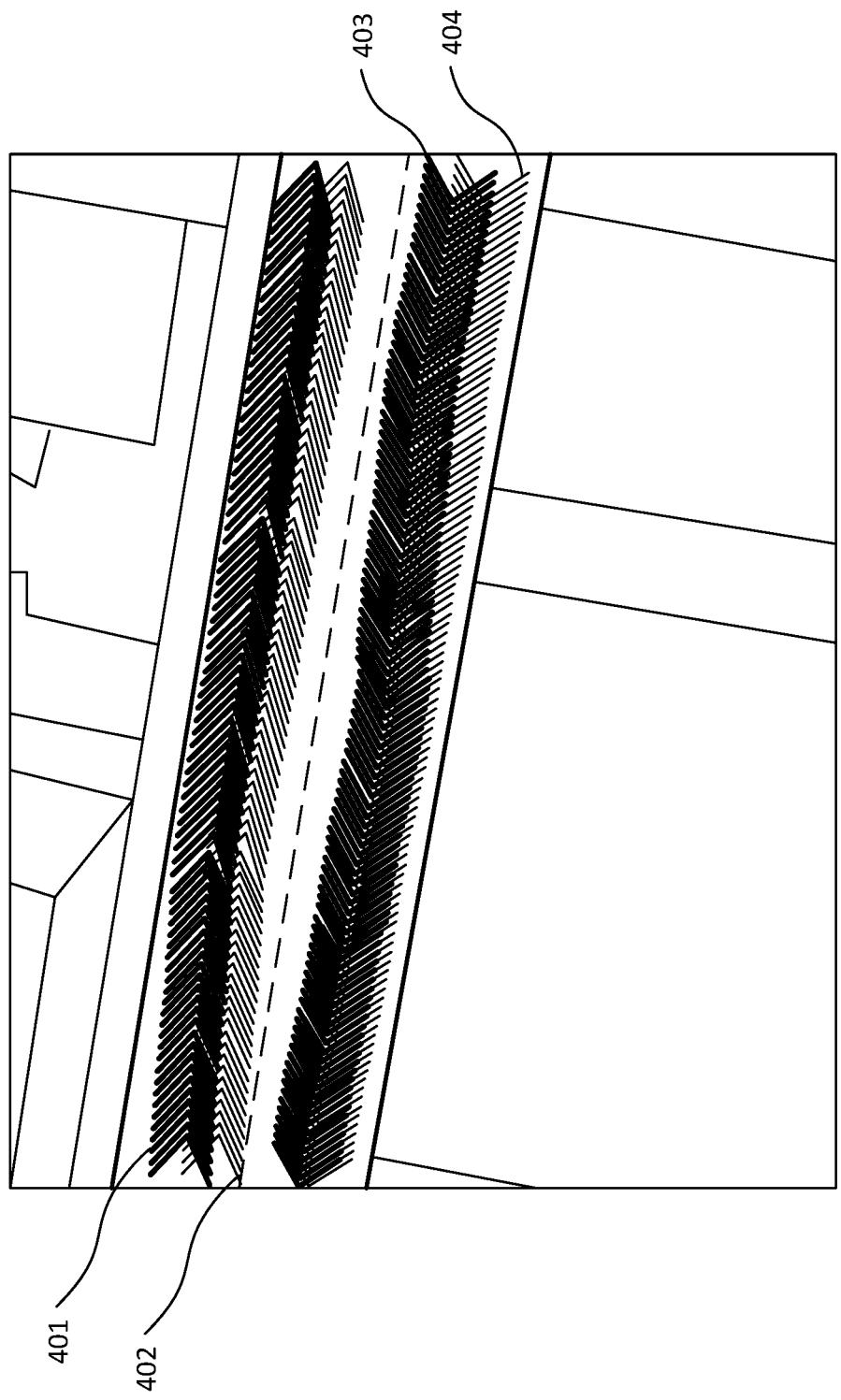

FIG. 4a illustrates the trajectories 400 extracted from the San Francisco data set, as generated by a randomised fleet of vehicles, which is used by this invention as prior trajectory data. FIGS. 4b, 4c and 4d correspond to points 410, 420 and 430, respectively, in FIG. 4a. These figures illustrate a few paths taken by the fleet of vehicles (401, 402, 403, 404) and their respective orientations. These figures illustrate the vehicles' motion along a curved road (FIG. 4b), an intersection (FIG. 4c) and a straight road (FIG. 4d).

In this way, the invention utilises location specific information for accurate future predictions. Instead of learning a global generic model or relying on limited variable models, the invention relies on historical vehicle trajectories in the locality of a newly detected vehicle to perform on-the-fly future position prediction, in substantially real time.

As aforementioned, the motion prior data comprises of a large set of individual trajectory samples that contain accurate 3D positions and rotations of vehicles driven through the area in the past. Mathematically, this is represented as $G = \{G^1, G^2, \ldots, G^N\}$, where each trajectory $G^i = \{s_1^i, s_2^i, \ldots, s_m^i\}$ is a sequence of observed positions, rotations, and velocities of the car at regular time intervals $t=1, 2, 3 \ldots$ as the car had been driven around the city. Using this method, there is no requirement to use manual or semantic annotations of the environment or any knowledge of traffic rules. Instead it is assumed that each trajectory or path implicitly captures all relevant local and road information in the behaviour of the vehicle's motion.

Referring back to FIG. 2, once prior trajectory information has been obtained, a number of future positions of the newly observed vehicle are estimated 203. In order to predict the future position of a vehicle at a time t, it is hypothesized that the newly observed vehicle is following the same path and trajectory pattern as one of the previous vehicles at the same location. Specifically, for each prior state $s_j^i$ of a prior trajectory, it is assumed that the newly observed vehicle is going to follow the same motion pattern as the previous vehicle that generated the prior trajectory continuing from that state. Given this assumption, the pose of the vehicle in the future is likely to be:

$$s_t = s_{j+t}^i + \epsilon$$

where $s_{j+t}^i$ is the observed pose of the vehicle previously driven through the area t seconds after the queried state (when the new vehicle was first observed) and $\epsilon$ is random noise taking into account that the trajectory can slightly differ. Examples of estimated future positions or samples can be seen in FIGS. 5a and 5b, where 501 illustrates a newly observed vehicle at a first time, t, and 502 illustrates the estimated future positions of the vehicle and a second time, t+1.

After having estimated the likely future position for the newly observed vehicle based on prior positions and trajectories of each or any of the previous vehicles, in order to improve the estimation, the samples are constrained by assessing the likelihood of the observed vehicle following the path of the one or more samples 204.

Mathematically, the distribution of the future pose is a weighted sum of individual factors:

$$p(s_t \mid s_0, G) = \frac{1}{Z} \sum K(s_j^i, s_0) p(s_t \mid s_{j+t}^i, \epsilon)$$

where Z is a normalisation factor:

$$Z = \Sigma K(s_j^i, s_0),$$

and $K(s_j^i, s_0)$ measures the similarity of a prior state to the current state of a newly observed vehicle, capturing the likelihood that it can indeed follow the exhibited prior motion pattern. This similarity is modelled as the sum of a number of individual factors:

$$K(s_j^i, s_0) = \exp\left\{-\frac{\|x_j^i - x_0\|^2}{\sigma_x^2} - \frac{\|r_j^i - r_0\|^2}{\sigma_r^2} - \frac{\|v_j^i - v_0\|^2}{\sigma_v^2}\right\}$$

$\|x_j^i - x_0\|^2$ is the Euclidean distance between the sample position and the observed position of the vehicle in the 3D space, $\|r_j^i - r_0\|^2$ is the relative difference of heading angles between the sample and the observed vehicle and $\|v_j^i - v_0\|^2$ is the difference in linear speed. The parameters $\sigma_x$, $\sigma_r$, and $\sigma_v$ model the relevance of the individual factors.

By constraining the samples in this way, the most likely estimates for the future positions of the observed vehicles based on the prior vehicle data are produced.

Thus, the probability density function $p(s_t|s_0, G)$ can be evaluated explicitly in a closed form. Moreover, a sampling procedure can be implemented efficiently by first sampling the corresponding prior state $s_j^i$ according to relevance factor K, performing table look-up for $s_{j+t}^i$ and adding noise. This is depicted in FIG. 6.

Figure 7:
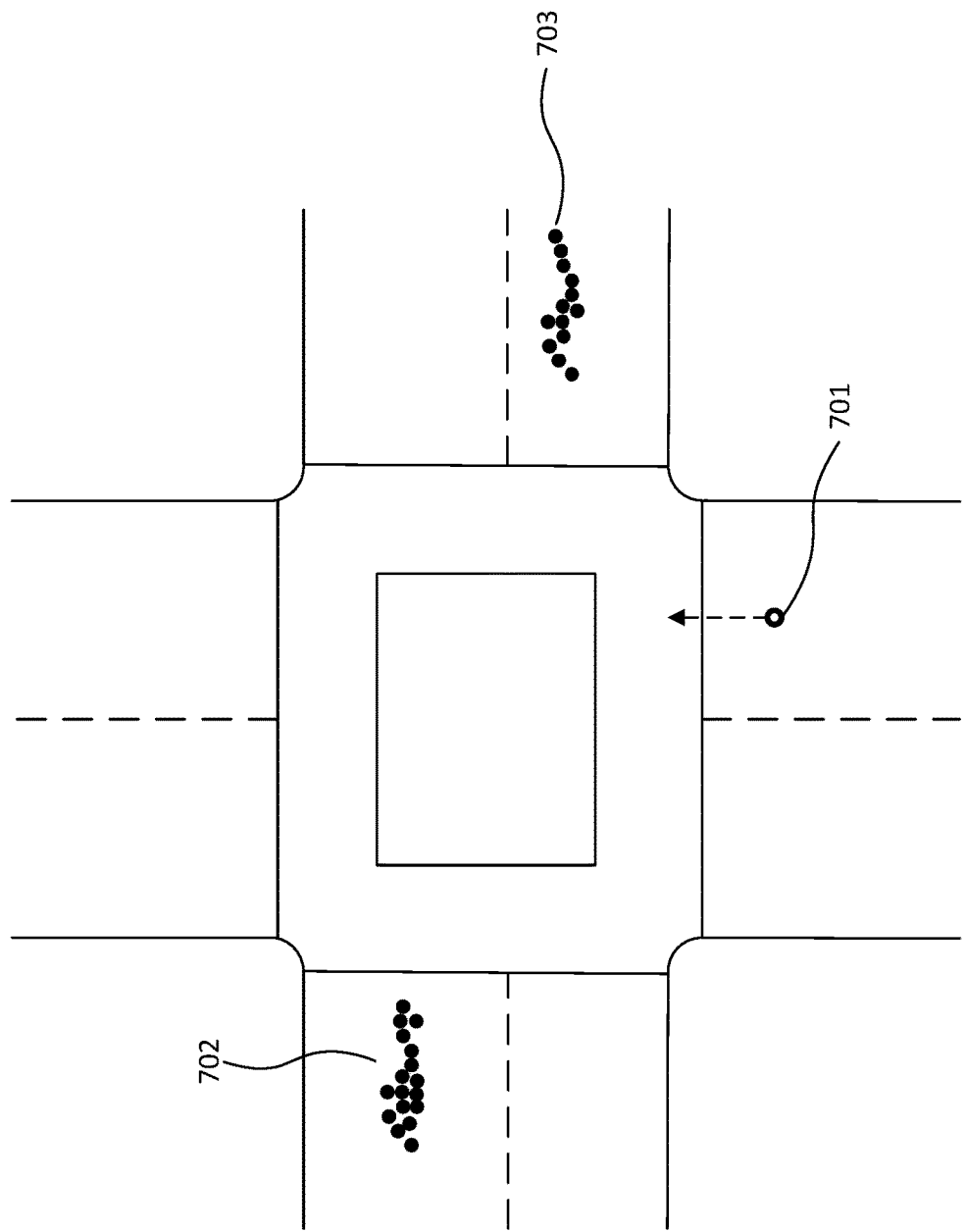
FIG. 7 illustrates samples of estimated positions produced in accordance with an embodiment.

An example of future vehicle motion prediction is illustrated in FIG. 7. 701 represents an observed vehicle at a query position and a velocity at time t. The groupings of 702 and 703 represent the distribution of predicted samples of the vehicle at a time of t+5. Notably, the road ahead of the vehicle is a one-way road in the opposite direction of the vehicle's motion. Without needing any manual input of road traffic signage, the method implicitly captures this information by using the paths of previous vehicles in the area. Thus, the only two potential options for the vehicle is taking a left or right at the intersection.

Figure 5A:
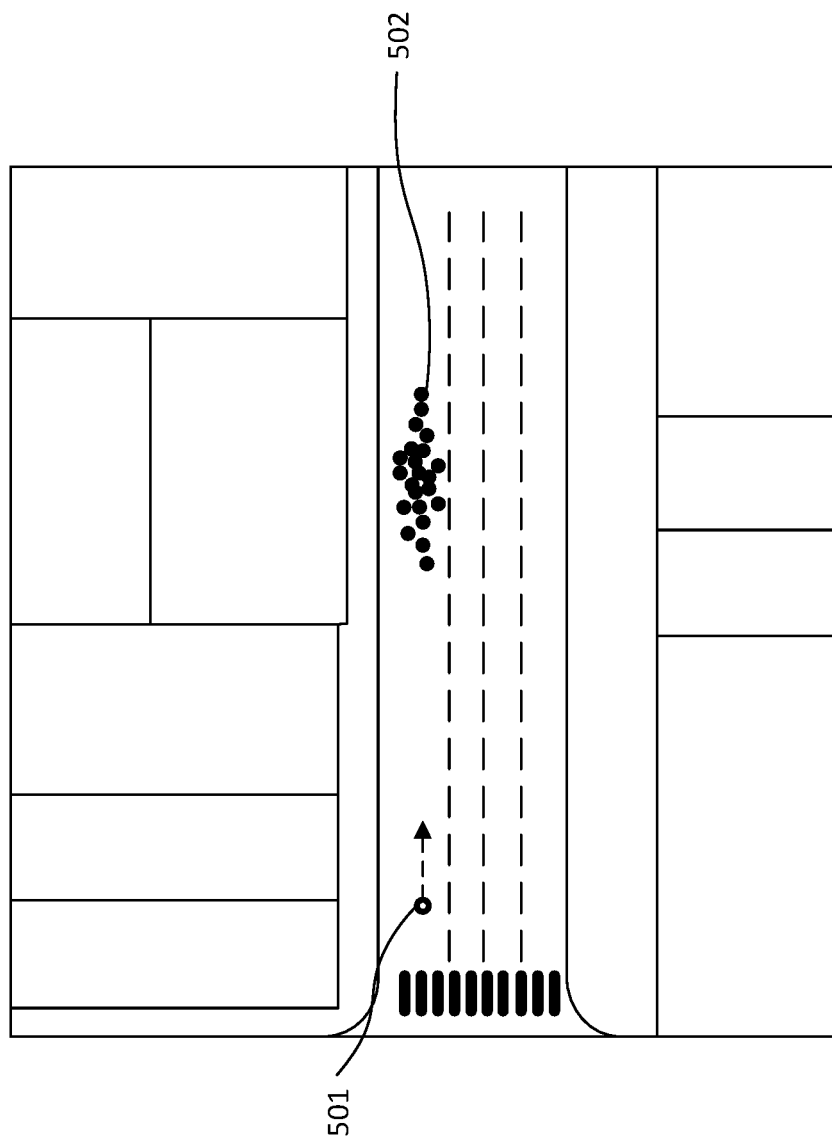
FIGS. 5a and 5b illustrate samples of estimated positions produced in accordance with an embodiment.
Figure 5B:
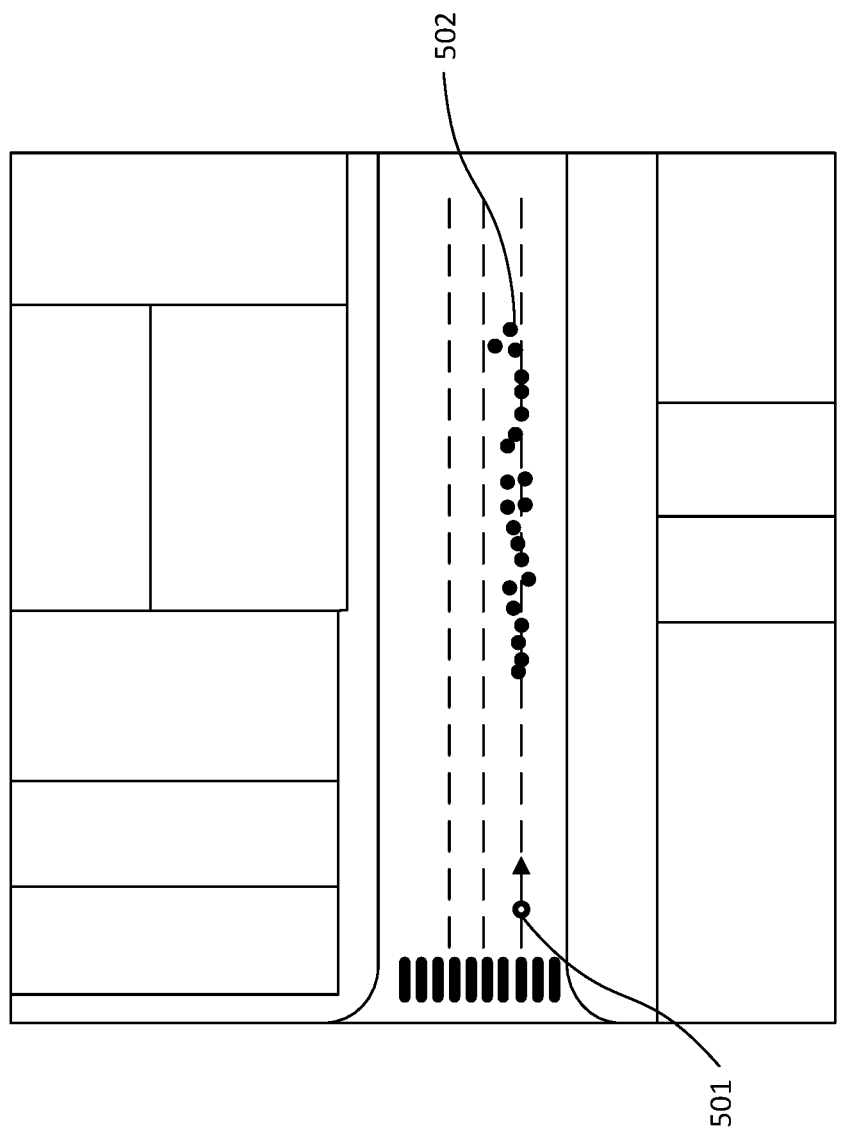

FIG. 5 also illustrates samples drawn from prior data. As depicted, sampling follows the previously observed trajectories of prior motion in the area while parameters a model the relevance of the individual components to the state of the observed vehicle. For example, a small value of $\sigma_v$ (FIG. 5a) results in predictions matching the current velocity of the newly observed vehicle while a larger $\sigma_v$ (FIG. 5b) results in future predictions sampled using a wider variety of the previously observed initial velocities.

Figure 8:
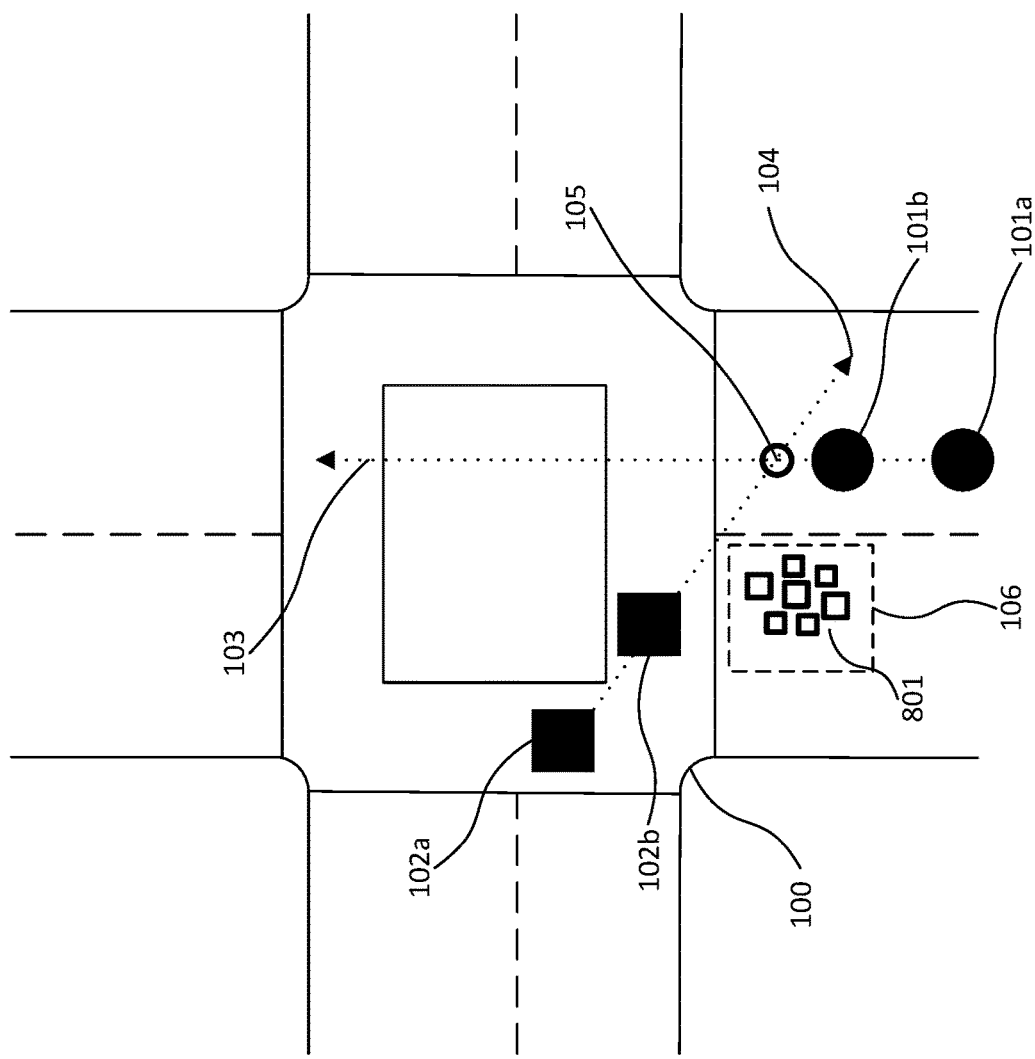
FIG. 8 illustrates an example embodiment of the present invention to predict the future position of a detected vehicle at an intersection.

In FIG. 1, motion prediction using linear extrapolation was illustrated. In contrast, FIG. 8 depicts how the method of this invention predicts the future movements of a vehicle in the same scenario. As opposed to relying on linear projections of the trajectories, 801 depicts a cluster of estimated future positions of the vehicle 102 using prior trajectory data.

Additionally, this invention can be used universally as a motion-prediction step in various vehicle-tracking systems for the purpose of vehicle safety and autonomy. The system may be used to drive motion prediction on a large scale in a variety of environmental and traffic conditions. Specifically, by creating large-scale accurate dataset of vehicle motion priors as a by-product of building a crowd-sourced city-scale 3D map of the environment and predicting a new vehicle's future position using the extracted prior data from the area.

The method vastly improves the precision over traditional methods and also demonstrates continuously improving performance as the amount of prior data grows.

Any system feature as described herein may also be provided as a method feature, and vice versa. The invention can be implemented by or as a system comprising: at least one processor; and a memory storing instructions that, when executed by the at least one processor, cause the system to perform the invention. The invention can be implemented by or as a computer program product comprising instructions which, when executed by a computer, cause the computer to perform a method comprising the invention. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention claimed is:

1. A method for estimating movements of an object, the method comprising;
   determining, by a system, initial state data of the object at a first time;
   determining, by the system, sequential trajectory data for one or more prior moving objects that intersected vicinity of the position of the object;
   estimating, by the system, future positions of the object, at a second time, based on the sequential trajectory data for the one or more prior moving objects; and
   constraining, by the system, the future positions of the object based on a comparison between the object and the one or more prior moving objects for which the sequential trajectory data intersects the vicinity of the position of the object, wherein the constrained future positions of the object are indicative of the estimated movement of the object at the second time.

2. The method of claim 1 wherein the initial state data of the object comprises a position, rotation and velocity in a 3D space.

3. The method of claim 1 wherein the sequential trajectory data is extracted from data used to construct 3D maps of an environment.

4. The method of claim 1 wherein determining the sequential trajectory data comprises using at least one visual data sensor in the one or more prior moving objects.

5. The method of claim 4 wherein said at least one visual data sensor comprises any or a combination of: an image camera; a video camera; a monocular camera; a depth camera; a stereo image camera; a high dynamic range camera, a light detection and ranging sensor; a radio detection and ranging sensor; an inertial measurement unit.

6. The method of claim 1 wherein determining the sequential trajectory data comprises performing structure from motion.

7. The method of claim 1 wherein estimating future positions of the object further comprises hypothesising that the object is following a trajectory path of each of the one or more prior moving objects in the same location as the object.

8. The method of claim 1 wherein estimating future positions of the object further comprises using location data from the one or more prior moving objects.

9. The method of claim 1 wherein estimating future positions of the object further comprises estimating a future pose of the object.

10. The method of claim 9 wherein the future pose estimate comprises a random noise model inclusion so as to account for deviations in the trajectory.

11. The method of claim 9 wherein the future pose estimate is the observed pose of a prior moving object, having previously intersected the vicinity of the position of the object, after a time interval.

12. The method of claim 1 wherein constraining the future positions of the object further comprises determining state comparisons between the one or more prior moving objects and the object.

13. The method of claim 12, wherein the differences comprises any one of, or any combination of:
a difference in a Euclidean distance in the 3D space;
relative difference of heading angle; and
difference in linear speed.

14. The method of claim 12 wherein constraining the future positions of the object are weighted in order to output either a wider or narrower set of samples.

15. A system for estimating movements of an object, the system comprising:
at least one processor; and
a memory storing instructions that, when executed by the at least one processor, cause the system to perform:
determining initial state data of the object at a first time;
determining sequential trajectory data for one or more prior moving objects that intersected vicinity of the position of the object;
estimating future positions of the object, at a second time, based on the sequential trajectory data for the one or more prior moving objects; and
constraining the future positions of the object based on a comparison between the object and the one or more prior moving objects for which the sequential trajectory data intersects the vicinity of the position of the object, wherein the constrained future positions of the object are indicative of the estimated movement of the object at the second time.

16. A computer program product comprising instructions which, when executed by a computer, cause the computer to perform a method comprising:
determining initial state data of an object at a first time;
determining sequential trajectory data for one or more prior moving objects that intersected vicinity of the position of the object;
estimating future positions of the object, at a second time, based on the sequential trajectory data for the one or more prior moving objects; and
constraining the future positions of the object based on a comparison between the object and the one or more prior moving objects for which the sequential trajectory data intersects the vicinity of the position of the object, wherein the constrained future positions of the object are indicative of the estimated movement of the object at the second time.

17. The system of claim 15 wherein estimating future positions of the object further comprises hypothesising that the object is following a trajectory path of each of the one or more prior moving objects in the same location as the object.

18. The system of claim 15 wherein constraining the future positions of the object further comprises determining state comparisons between the one or more prior moving objects and the object.

19. The computer program product of claim 16 wherein estimating future positions of the object further comprises hypothesising that the object is following a trajectory path of each of the one or more prior moving objects in the same location as the object.

20. The computer program product of claim 16 wherein constraining the future positions of the object further comprises determining state comparisons between the one or more prior moving objects and the object.

* * * * *